June 9, 1942.   W. R. EVANS   2,286,075
THERMIT WELDING APPARATUS
Filed Jan. 21, 1941
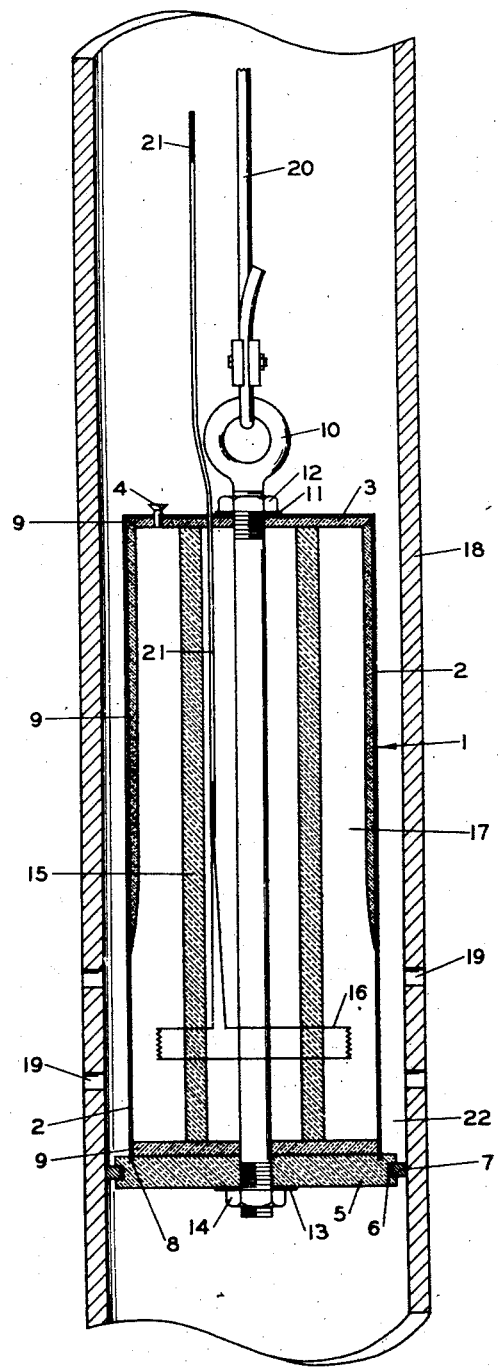
INVENTOR
WALTER R. EVANS
BY
ATTORNEY Patented June 9, 1942

2,286,075

UNITED STATES PATENT OFFICE 2,286,075

THERMIT WELDING APPARATUS

Walter R. Evans, Bartlesville, Okla., assignor to Phillips Petroleum Company, a corporation of Delaware Application January 21, 1941, Serial No. 375,333

6 Claims. (Cl. 22—58)

This invention relates to welding and more particularly to a thermit welding apparatus for the welding of hollow members such as oil well casing.

During the life of a producing oil well, which usually extends over a long period of years, the casing often develops leaks in its side walls, or the casing may have been perforated to allow fluids to enter or to leave thereby. Later, it may be desirable to plug or seal these openings in the casing. The present practice of repairing casing consists essentially of running a cement retainer below the opening in the casing and forcing a neat cement slurry under pressure through the opening and into the adjacent formation and annular space between the casing and well bore proper. Upon setting, this cement usually forms a bond with the pipe which prevents any fluids from entering or leaving the casing. The cement remaining within the casing and the cement retainer are then drilled out. This method is disadvantageous as the bond is sometimes incomplete, and the cost of repairing casing by this method is usually considerable and in many cases uneconomical.

I propose to repair casing and the like by a device which eliminates the use of the foregoing apparatus by building up the side walls of the casing with a similar material to that used in the manufacture of this casing. This invention consists essentially of an apparatus which can be lowered in the well to a point opposite a break or perforation in a casing and a means for operating the apparatus to form a molten metal from material contained therein. By virtue of the heat content of the molten metal, it will disintegrate the apparatus at the predetermined places, heat the casing to the proper welding temperature, and weld a layer of metal on the internal surface of the casing.

While the expression "thermit" may be strictly defined as being a mixture of finely divided aluminum and an oxide of a chemically weaker metal, such as ferric oxide, I propose to use this term in a much broader sense so as to include any substance or mixture of substances which generate heat due to chemical reaction.

My invention has as its primary object the provision of a thermit welding apparatus for welding hollow cylindrical members, including oil well casing and the like.

Additional objects and advantages will be apparent to persons skilled in the art by reference to the following description and annexed drawing, which is an elevation view of my invention partly in cross section.

Referring to the drawing, I have designated a thermit welding apparatus housing or receptacle by the numeral 1. The housing consists of a metal cylindrical wall 2, a cap 3 having a vent 4 that seals the housing under normal pressure and temperature conditions, a heat resistant clay base 5, which is grooved at 6 to receive a split ring washer 7 and at 8 to receive the bottom of metal wall 2. Cap 3, base 5 and the upper part of the cylinder wall 2 are lined with a heat insulating material 9, such as asbestos. An eyebolt 10 extends through cap 3 and base 5 and is threaded at the top and bottom so that a washer 11 and nut 12 cooperate with a second washer 13 and a second nut 14 to assemble housing 1. A fire clay casting 15 which supports electrical resistance coils 16 is placed within the housing concentric with eye-bolt 10. The outside surface of the clay casting and the internal surface of wall 2 form a space 17 into which a finely divided mixture of thermit is placed when the housing is assembled. It is to be noted that the chemical reaction takes place within this space.

I have shown the assembled housing 1 suspended within an oil well casing 18 which extends downwardly from the surface of the ground so that the non-insulated portion of the cylindrical wall 2 is opposite the break or perforations 19 in the casing. The housing is lowered in the usual manner from the surface of the ground by a cable 20 which is secured to eye-bolt 10. An electrical conductor cable 21 connects resistance coils 16 with a suitable source of electricity (not shown) at the surface of the ground. Cable 21 is unspooled simultaneously with cable 20 as the housing is lowered into casing 18. Split-ring washer 7 expands outwardly against the casing to form a retaining space 22 which is closed at the bottom by the split-ring washer.

In the practice of my invention, the location of perforations 19 is determined prior to "running" my device into casing 18. After the depth of the perforations is known, the device is assembled with a predetermined amount of thermit placed in space 17. Conductor cable 21 is attached to electrical resistances 16 and cable 20 is secured to eye-bolt 10. Split-ring washer 7 is placed in groove 6 so that it can expand against casing 18 and the device is then lowered until it is opposite perforations 19. The thermit, which, for the sole purpose of explanation is assumed to be a mixture of iron oxide and aluminum, is ignited by heating the mixture by means of the electrical resistance coils 16. The reaction between the iron oxide and aluminum to form pure metallic iron takes place very rapidly with the resulting temperature of the molten mass being equal to nearly twice the melting point of iron. Thus, the heat of the molten iron will be partially dissipated to the cylinder wall 2, causing it to melt. It is to be noted that the part of housing 1 which is opposite the perforations 19 is not lined with a heat insulating material, hence, the unlined portion will melt before the lined portion and the molten contents in space 17 will flow into retaining space 22 above washer 7 and fill perforations 19. As there is still sufficient heat within the molten mass to heat the casing 18 to a welding temperature, a layer of metal is welded on the casing, sealing the perforations. In the event the pressure within the space 17 becomes excessive before the housing is melted, vent 4 allows the gases and slag to leave space 17.

During the welding operation, casing 18 will expand, especially in the region near perforations 19, because of the heat of the molten material from which this weld is made. Due to the weight of the casing, this expansion will tend to thicken the sidewalls of the casing, as there will be no appreciable upward movement of the casing. As the casing is suspended in the usual manner at the surface of the ground, there will be no downward movement of the casing when the weld cools. To relieve the great stresses which would develop when the weld cools, the casing is lowered a predetermined distance. After the welding is completed, any rough edges may be removed by a milling tool.

From the foregoing, it is believed that the construction, operation, and advantages of my present invention will be readily comprehended by persons skilled in the art. It is to be clearly understood, however, that various changes in carrying out the process and in the apparatus set forth above may be made without departing from the scope of the invention, it being intended that all matter contained in the description or shown in the drawing shall be interpreted as illustrative only and not in a limiting sense.

I claim:

1. In apparatus adapted to be lowered into a conduit that extends downwardly in a well bore for carrying out a thermit welding operation within the conduit, the combination comprising a receptacle for containing a supply of thermit, said receptacle including a heat resistant base, a shell extending upwardly of the base, and heat resistant material on the inside of the upper portion of the shell, means for effecting an adequate seal between the receptacle and the inner surface of the conduit, and a heating element within the receptacle.

2. In apparatus adapted to be lowered into a conduit that extends downwardly in a well bore for carrying out a thermit welding operation within the conduit, the combination comprising a receptacle for containing a supply of thermit, said receptacle including a heat resistant base, a shell extending upwardly of the base, and heat resistant material on the inside of the upper portion of the shell, means for effecting an adequate seal between the base of the receptacle and the inner surface of the conduit, and a heating element within the receptacle.

3. In apparatus adapted to be lowered into a conduit that extends downwardly in a well bore for carrying out a thermit welding operation within the conduit, the combination comprising a receptacle for containing a supply of thermit, said receptacle including a heat resistant base, a shell extending upwardly of the base, and heat resistant material on the inside of the upper portion of the shell, a ring surrounding the base of the receptacle, said ring being adapted to engage the inner surface of the conduit to form an adequate seal between the base and the conduit, and electrical heating means within the receptacle.

4. In apparatus adapted to be lowered into a conduit that extends downwardly in a well bore for carrying out a thermit welding operation within the conduit, the combination comprising a receptacle for containing a supply of thermit, said receptacle including a heat resistant base, a metallic tubular side wall, and a top wall, heat resistant material on the interior of the upper portion of the receptacle, a heat resistant tubular member extending from the base to the top wall and spaced from the side wall, a heating element supported by the tubular member in the lower portion of the space between the tubular member and the side wall, and means for effecting an adequate seal between the receptacle and the inner surface of the conduit.

5. In apparatus adapted to be lowered into a conduit that extends downwardly in a well bore for carrying out a thermit welding operation within the conduit, the combination comprising a receptacle for containing a supply of thermit, said receptacle including a heat resistant base, a metallic tubular side wall, and a top wall, heat resistant material on the interior of the upper portion of the receptacle, a heat resistant tubular member extending from the base to the top wall and spaced from the side wall, a heating element supported by the tubular member in the lower portion of the space between the tubular member and the side wall, and means for effecting an adequate seal between the base of the receptacle and the inner surface of the conduit.

6. In apparatus adapted to be lowered into a conduit that extends downwardly in a well bore for carrying out a thermit welding operation within the conduit, the combination comprising a receptacle for containing a supply of thermit, said receptacle including a heat resistant base, a metallic tubular side wall, and a top wall, heat resistant material on the interior of the upper portion of the receptacle, a heat resistant tubular member extending from the base to the top wall and spaced from the side wall, electrical heating means supported by the tubular member in the lower portion of the space between the tubular member and the side wall, and a ring surrounding the base of the receptacle, said ring being adapted to engage the inner surface of the conduit to form an adequate seal between the base and the conduit.

WALTER R. EVANS.